United States Patent
Merritt et al.

(10) Patent No.: US 6,292,615 B1
(45) Date of Patent: Sep. 18, 2001

(54) OPTICAL FIBER FEEDTHROUGH

(75) Inventors: Scott A. Merritt, Vienna, VA (US); Frederick C. Lorenzen, Simsbury, CT (US)

(73) Assignee: Uniphase Telecommunications Products, Inc., Bloomfield, CT (US)

( * ) Notice: Subject to any disclaimer, the term of this patent is extended or adjusted under 35 U.S.C. 154(b) by 0 days.

(21) Appl. No.: 09/265,282

(22) Filed: Mar. 9, 1999

(51) Int. Cl.$^7$ ..................................................... G02B 6/00
(52) U.S. Cl. ............................................................ 385/138
(58) Field of Search ................................ 385/138, 66, 84, 385/139, 137, 115, 88

(56) References Cited

U.S. PATENT DOCUMENTS

| | | | |
|---|---|---|---|
| 4,033,668 | 7/1977 | Presby | 350/96 C |
| 4,214,809 | 7/1980 | Reh | 350/96.2 |
| 4,252,457 | 2/1981 | Benson et al. | 403/284 |
| 4,295,707 | 10/1981 | Nakai et al. | 350/96.2 |
| 4,296,996 | 10/1981 | Niiro et al. | 350/96.2 |
| 4,345,816 | 8/1982 | Nakai et al. | 350/96.2 |
| 4,357,072 | 11/1982 | Goodfellow et al. | 350/96.2 |
| 4,360,249 | 11/1982 | Slemon | 350/96.18 |
| 4,389,086 | 6/1983 | Furusawa et al. | 350/96.2 |
| 4,413,881 | 11/1983 | Kovats | 350/96.2 |
| 4,548,465 | 10/1985 | White | 350/96.2 |
| 4,593,970 | 6/1986 | Rhodes | 350/96.2 |
| 4,653,846 | 3/1987 | Yamazaki et al. | 350/96.2 |
| 4,657,346 | 4/1987 | Berry et al. | 350/320 |
| 4,682,846 | 7/1987 | Cowen | 350/96.18 |
| 4,690,487 | 9/1987 | Hale et al. | 350/96.21 |
| 4,695,125 | 9/1987 | Sinclair et al. | 350/96.2 |
| 4,699,456 | 10/1987 | Mackenzie | 350/96.2 |
| 4,707,065 | 11/1987 | Jenkins | 350/96.2 |
| 4,708,429 | 11/1987 | Clark et al. | 350/96.2 |
| 4,708,431 | 11/1987 | Pikulski et al. | 350/96.2 |
| 4,738,505 | 4/1988 | Jones | 350/96.2 |
| 4,752,109 | 6/1988 | Gordon et al. | 350/96.2 |
| 4,762,386 | 8/1988 | Gordon et al. | 350/96.2 |
| 4,818,053 | 4/1989 | Gordon et al. | 350/96.18 |
| 4,822,130 | 4/1989 | Maranto et al. | 350/96.2 |
| 4,859,021 | 8/1989 | Wall | 350/96.2 |
| 4,865,410 | 9/1989 | Estrada et al. | 350/96.2 |

(List continued on next page.)

FOREIGN PATENT DOCUMENTS

| | | |
|---|---|---|
| 0 503 467 A1 | 9/1992 | (EP) . |
| 0 631 160 A1 | 12/1994 | (EP) . |
| 2 730 820 | 8/1996 | (FR) . |
| WO 98/02766 | 1/1998 | (WO) . |
| WO98/39677 | 9/1998 | (WO) . |

OTHER PUBLICATIONS

Annex to Form PCT/ISA/206 for PCT/US00/06467, Sep. 1, 2000.

Primary Examiner—Frank G. Font
Assistant Examiner—Michael P. Stafira
(74) Attorney, Agent, or Firm—McCormick, Paulding & Huber LLP

(57) ABSTRACT

Disclosed is an optical fiber feedthrough that meets the industry load standard of 1 kg. The optical fiber feedthrough includes a length of optical fiber including a buffer layer and a core. The length of fiber extends along a longitudinal axis and typically through a passage in a package wall for communicating an optical signal between the exterior and the interior of the package. The optical fiber feedthrough includes a volume of bonding agent adhering to the buffer layer and to a bonding surface integral with the package, the volume of bonding agent disposed for asymmetrically securing the fiber to the package such that a load of less than approximately 1 kg applied to a first end of the length of fiber substantially not transmitted to the other end of the length of fiber. The invention also includes feedthrough assembly having a feedthrough to which the length of optical fiber is asymmetrically secured. The feedthrough body can be secured to the package wall of the optical package.

35 Claims, 6 Drawing Sheets

U.S. PATENT DOCUMENTS

| | | | |
|---|---|---|---|
| 4,904,046 | 2/1990 | Paschke et al. | 350/96.2 |
| 4,997,279 | 3/1991 | Gordon et al. | 356/153 |
| 5,046,814 | 9/1991 | Crespo-Ruiz et al. | 385/113 |
| 5,061,035 | 10/1991 | Rogers, Jr. | 385/115 |
| 5,077,819 | 12/1991 | Greil et al. | 385/79 |
| 5,091,989 | 2/1992 | Dannoux | 385/70 |
| 5,113,475 | 5/1992 | Baker | 385/138 |
| 5,143,531 | 9/1992 | Kramer | 65/3.11 |
| 5,151,967 | 9/1992 | Ebinuma | 385/138 |
| 5,155,795 | 10/1992 | Wasserman et al. | 385/138 |
| 5,157,753 | 10/1992 | Rogers, Jr. | 385/115 |
| 5,177,806 | 1/1993 | Abbott et al. | 385/76 |
| 5,210,815 | 5/1993 | Alexander et al. | 385/138 |
| 5,247,530 | 9/1993 | Shigeno et al. | 372/36 |
| 5,305,413 | 4/1994 | Payne | 385/128 |
| 5,381,494 | 1/1995 | O'Donnell et al. | 385/49 |
| 5,426,715 | 6/1995 | Moisson et al. | 385/76 |
| 5,434,941 | 7/1995 | Bechtel et al. | 385/94 |
| 5,515,473 | 5/1996 | Yamauchi et al. | 385/138 |
| 5,535,296 | 7/1996 | Uchida | 385/89 |
| 5,544,272 | 8/1996 | Carratt et al. | 385/128 |
| 5,568,585 | 10/1996 | Kramer | 385/139 |
| 5,588,086 | 12/1996 | Fan | 385/138 |
| 5,590,233 | 12/1996 | Carratt et al. | 385/100 |
| 5,613,026 | 3/1997 | Nagata et al. | 385/94 |
| 5,613,031 | 3/1997 | Tanabe et al. | 385/138 |
| 5,631,992 | 5/1997 | Takahashi et al. | 385/94 |
| 5,658,364 | 8/1997 | DeVore et al. | 65/431 |
| 5,664,043 | 9/1997 | Donaldson et al. | 385/138 |
| 5,687,267 | 11/1997 | Uchida | 385/89 |
| 5,960,143 | 9/1999 | Dannoux et al. | 385/92 |

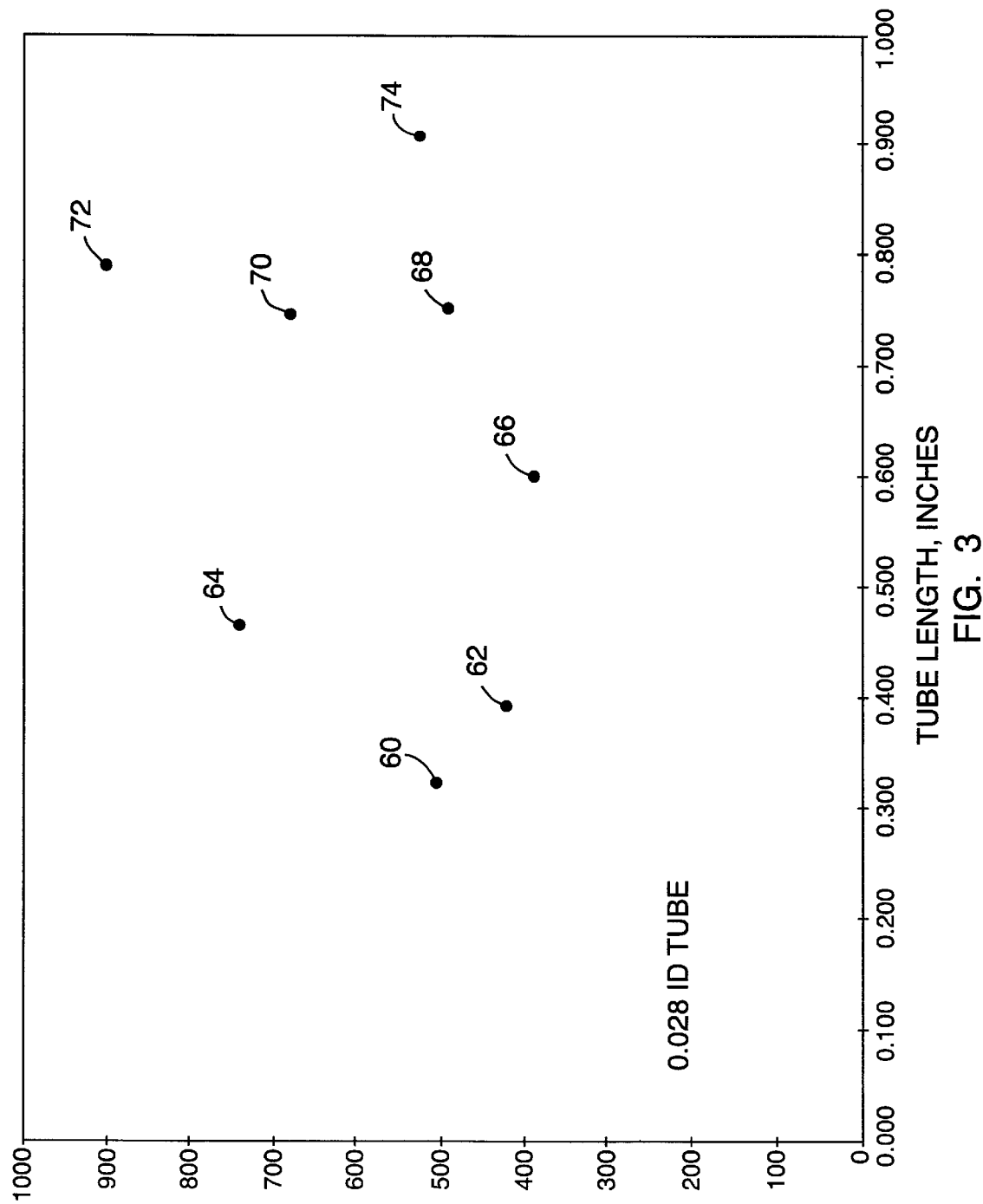

| EPOXY TYPE (all 301-2 Resin and hardener) | PULLSTRENGTH at FAILURE (grams) | PEAK PULLSTRENGTH (grams) | FAILURE MECHANISM | EPOXY VISCOSITY (cps) |
|---|---|---|---|---|
| OH100 (blue) | 1202 | 1770 | bubbles | 122 |
| 301-2 | 1706 | 1975 | fiber curl | 500 |
| 301-2 | 1880 | 1880 | complete pullout | 500 |
| OE129 | 911 | 911 | complete pullout | 14000 |
| OE129 | 1100 | 1157 | fiber curl | 14000 |

OPTICAL FIBER FEEDTHROUGH

BACKGROUND OF THE INVENTION

Optical communication systems have many advantages over older, more established technologies and are increasingly replacing those technologies in many applications. Optical fiber is the workhorse of the typical optical communication system, and the low loss, light weight, small size, flexibility and high intrinsic bandwidth of optical fiber help make optical communication systems more desirable than competing systems for the communication of both of digital and analog signals. Of course, there is more than fiber in an optical communication system. A typical system includes an optical transmitter that generates an optical beam and modulates the beam with an electrical information signal. The optical fiber, perhaps spanning a continent, then propagates the modulated optical signal to a receiver that demodulates the optical beam to recover the electrical signal. Optical fiber not only carries the signal on cross-continental journeys, but also interconnects the separately packaged components that make up a typical receiver, transmitter or repeater of the optical communication system. For example, included in a typical transmitter package are an optical beam generator and a modulator, each typically packaged separately, and which are in optical communication via short lengths of optical fiber.

Optical fiber feedthroughs are an important feature of each discrete package and of the overall transmitter package, providing a transition from the environment external to the package to the internal operating environment of the package. One important function of an optical fiber feedthrough is to prevent loads placed on the portion of fiber external to the package from being transferred to the fiber within the package, where the delicate transitions from fiber to the optical device can be readily damaged. For example, one standard becoming prevalent in the industry requires that the fiber external to a package can be loaded to 1 kilogram (kg) without substantially transmitting the load to the fiber core within the package, such that the optical interconnect to an optical device within the package is not adversely affected.

As is understood by those of ordinary skill in the art, there are many known designs for optical fiber feedthroughs. However, such known feedthroughs are often unduly complex, may weaken the fiber, are time consuming to install, or do not adequately prevent the load applied to the fiber from being transferred to the delicate optical fiber interconnect within the package. A simple and economical optical fiber feedthrough for preventing selected loads from being transferred to the fiber within the package would be a welcome advance in the art.

Accordingly, it is a principal object of the present invention to address one or more of the disadvantages of the prior art, and to provide an improved optical fiber feedthrough.

Other objects will be apparent to one of ordinary skill in light of the following disclosure.

SUMMARY OF THE INVENTION

According to one aspect, the invention provides an optical package assembly for housing an optical component within the package and including provision for communicating an optical signal from an environment exterior to the package to the optical component. The optical package assembly includes a package wall including a passage therethrough; a length of optical fiber including a buffer layer, the length of fiber extending along a longitudinal axis and through the passage for communicating the optical signal between the exterior and the interior of the package; and a volume of bonding agent adhering to the buffer layer and to a bonding surface integral with the package. In particular, the volume of bonding agent is disposed for asymmetrically securing the fiber to the package such that a load of less than approximately 1 kg applied to a first end of the length of fiber is not substantially transmitted to the other end of the length of fiber. The term "asymmetrically secured" refers to the distribution of forces acting on the buffer layer of the fiber, as described in more detail below.

According to another aspect, the invention provides an optical fiber feedthrough assembly for receiving a fiber including a buffer layer and for securing the fiber to a package. The fiber feedthrough assembly includes a feedthrough body, the feedthrough body defining a longitudinally extending passage therethrough and having a bonding surface and an outer surface for securing to the optical package; a length of optical fiber having a core and buffer layers, the length passing through the passage and along the bonding surface; and a volume of bonding agent for asymmetrically securing the fiber to the feedthrough body for reducing the transmission of force applied to a first end of the fiber to the second end thereof, the volume having an inner surface adhering to the buffer layer and an outer surface adhering to the bonding surface.

In yet another aspect, the invention provides an optical fiber feedthrough body extending along a longitudinal axis. The optical fiber feedthrough body includes a first section having an inner wall surface defining a longitudinally extending first passage therethrough and having a cylindrical outer surface and also includes a second section having a wall having an outer surface and a longitudinally extending inner bonding surface. The bonding surface raised relative to a portion of the first inner wall surface defining the first passage, and the center section wall corresponding to a least a first length of the center section extends less than fully circumferentially about the longitudinal axis. In addition, the feedthrough body includes a third section defining a second longitudinally extending passage therethrough and having a cylindrical outer surface. The passages and bonding surface are disposed for receiving a length of optical fiber through the passages and adjacent the bonding surface for bonding thereto.

In a further aspect, the invention provides a method of providing an optical fiber feedthrough for communicating an optical signal from a first side of a package wall to a second side thereof and such that loads of less than approximately 1 kg applied to one end of the fiber are not substantially transmitted to the other end of the fiber. The method includes the steps of providing a length of the optical fiber having a core and a buffer layer; providing a passage through the package wall; providing a bonding surface integral with the package wall and disposed for securing the length of fiber when the length extends through the passage; placing the length of fiber through the passage; providing a volume of bonding agent; and asymmetrically securing the fiber to the package wall such that loads of less than approximately 1 kg applied to a first end the fiber are substantially not transmitted to the core of the fiber at the other end of the fiber, the step of asymmetrically securing including disposing the bonding agent for adhering to the buffer layer and to the bonding surface.

BRIEF DESCRIPTION OF THE DRAWINGS

The foregoing and other objects, advantages and aspects of the invention will be apparent from the following description and the accompanying drawings, in which:

FIG. 3 is a graph of test results on feedthroughs of the type shown in FIG. 1A, showing the load applied at failure of the feedthrough as a function of the length of the feedthrough tube;

DETAILED DESCRIPTION OF THE PREFERRED EMBODIMENTS

Figure 1B:
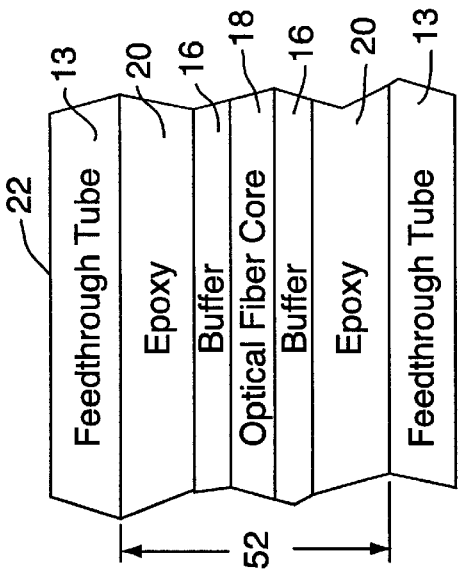
FIG. 1B is a cross-section of the feedthrough of FIG. 1 taken along the section line 1B—1B.

FIG. 1A is a perspective view of a prior art optical feedthrough assembly 12 including a feedthrough body 13, in this instance a tube, and a length of optical fiber 14. The length of optical fiber 14 extends generally along the longitudinal axis 15 and passes through a passage in the feedthrough tube 13. The length of optical fiber 14 includes a buffer layer 16 disposed over an optical fiber core 18. A volume of bonding agent 20, such as an epoxy, is disposed within the passage and adheres to the buffer layer 16 and to the feedthrough tube 13, thus securing the fiber 14 to the feedthrough tube 13. Typically, the outer surface 22 of the tube 13 is epoxied, soldered or otherwise secured to the walls of a passage through a wall of an optical package (not shown in FIGS. 1A and 1B). The length of optical fiber 14 thus provides for the communication of an optical signal from the environment exterior to the optical package to the a component housed within the package. FIG. 1B is a cross-sectional view of the optical fiber feedthrough assembly 12 of FIG. 1A taken along line 1B—1B of FIG. 1A, illustrating the tube 13, volume of bonding agent 20 which, as shown FIG. 1B, can be an epoxy, the buffer layer 16, and the optical fiber core 18. The core typically includes a fiber coated with a cladding layer (not shown).

Figure 2:
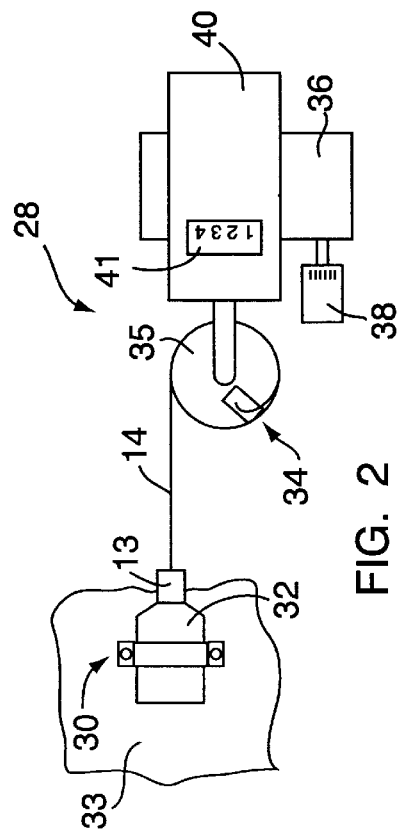
FIG. 2 is a schematic illustration of one apparatus for applying a load to an optical fiber of an optical fiber feedthrough assembly.

FIG. 2 is a schematic illustration of an apparatus 28 for applying a load to the length of optical fiber 14 for determining the load that the fiber optical feedthrough assembly 12 can withstand. The bracket 30 secures a chuck 32 to a fixed face 33. The chuck mounts the feedthrough tube 13 and adhesive 34 secures the length of optical fiber 14 to a wheel 35. A translation stage 36 includes a micrometer control 38 for translating the fixture 40 (which mounts the wheel 35) in a direction generally parallel to the length of optical fiber 14. A force gauge 41 indicates the load applied to the length of optical fiber 14. As noted above, it is an industry standard requirement that the feedthrough assembly 12 withstand loads of up to 1 kg applied to the length of optical fiber 14. The end 44 of the optical fiber core 18 is typically attached to an optical component and the transmission of loads to the end 44 will sever or degrade the optical connection to the optical component. Such an optical connection is indicated at 50 in FIG. 7, which is discussed in more detail below.

Extensive load testing of the optical fiber feedthrough assembly 12, such as with the apparatus 28 shown in FIG. 2, indicates that achieving the desired 1 kg load standard can be problematic for certain fiber types, such as the Panda fiber available from Fujikura. In such tests, numerous optical fiber feedthrough assemblies were constructed, and the length 54 of the feedthrough tube as well as the inner diameter (52 in FIG. 1B) was varied. Various bonding agents 20, typically epoxies, were used to secure the length of optical fiber 14 to the feedthrough tube 13. The amount of the bonding agent was varied. In almost all instances, the 1 kg load standard is not met.

FIG. 3 illustrates the results of one experiment in which the length of the feedthrough tube 13 was varied. Note that for selected lengths ranging from 3/10-inch to 9/10-inch, the load standard of 1 kg is not met. Also, there is no simple relationship between the length and the load varying capability of the fiber optical feedthrough assembly 12. The data points 60 to 74 appear randomly distributed.

Meeting the industry load standard means that optical interconnects between the length of optical fiber 14 and an optical device are not substantially degraded. Load testing of fiber optical feedthrough assemblies 12, as well as complete modulator assemblies, indicated that the load can be transmitted along the length of fiber 14 to components internal to the package, even though there was no visible failure of the fiber feedthrough assembly, i.e., there was no visible pulling of the length of optical fiber through the feedthrough tube 13. Observation of the point 70, shown in FIG. 3, of the feedthrough assembly 12 when mounted in the apparatus 28 and under load revealed that the fiber core can slip relative to the buffer layer, and that one indication of such slippage is often the formation and movement of bubbles along the interface between the core 18 and the buffer layer 16. Lengths of optical fiber were epoxied between microscope slides and observed under load to verify that the formation of bubbles and movement of the bubbles is an indicator of movement of the inner fiber core relative to the buffer layer 18.

Thorough experimental testing of the prior art feedthrough assembly 12 indicated that despite the type of bonding agent used, the diameter 52 of the feedthrough tube or the length 54 of the feedthrough tube, it is unlikely that the required load standard of 1 kg could be met repeatedly and reliably by a feedthrough assembly of the design shown in FIGS. 1A and 1B.

Consideration of the results of extensive testing of the feedthrough assembly 12 of FIGS. 1A and 1B, led to the realization that shrinkage of the bonding agent 20 during curing can cause forces to act on the buffer layer 16 that reduce the adhesion of the buffer layer to the inner fiber core 18, facilitating slippage of the inner fiber core 18 relative to the buffer when the length of fiber 14 is under load, and hence transmittal of too much of the load to an optical fiber interconnect at the other end of the length of optical fiber.

Figure 4:
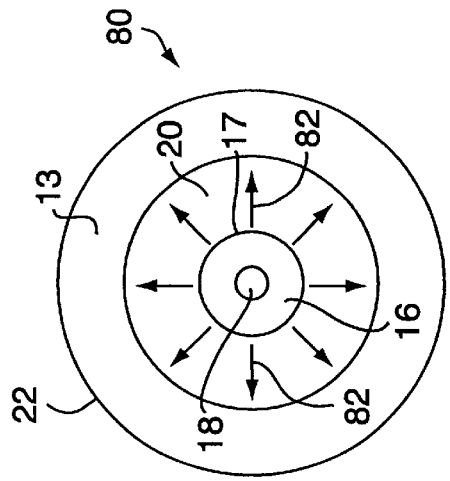
FIG. 4 is cross-sectional view of the feedthrough assembly of FIG. 1A taken along the section line 4—4 and illustrating the forces acting on the buffer layer of the optical fiber.

FIG. 4 is a cross-section of the feedthrough assembly 12 taken along section line 4—4, and illustrates forces considered to be acting on the buffer layer 16 due to shrinkage of the bonding agent 20 during curing. Note that the cross-section 80 is substantially symmetric about the longitudinal axis 15, resulting in forces indicated by force vectors 82 that act about the buffer layer 16 to pull the buffer layer outward away from the inner fiber core 18. The force vectors 82 typically nearly all act radially outward from the longitudinal axis 15 and are of substantially equal magnitude, and hence can be said to be circumferentially uniform about the longitudinal axis. In practice, the symmetry described above is not exact, as the fiber is typically not exactly centered about the longitudinal axis 15.

Figure 5:
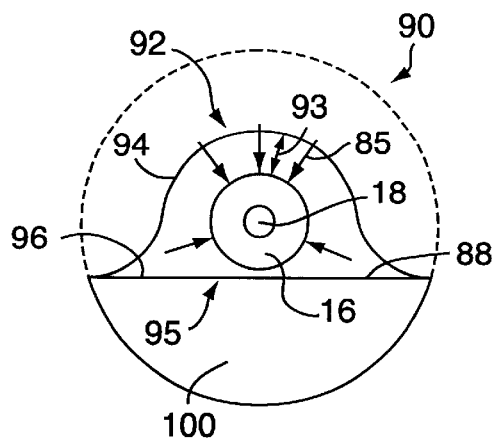
FIG. 5 is a cross-sectional view of a fiber feedthrough asymmetrically securing the optical fiber in accordance with the present invention.

FIG. 5 illustrates a cross-section of a feedthrough assembly provided in accordance with the invention. According to the invention, the symmetry or near symmetry depicted in FIG. 4 is broken and forces on the buffer layer 16 are not as shown in FIG. 4. The length of optical fiber is asymmetrically secured to the feedthrough assembly. Asymmetrically secured, as used herein, refers to securing the fiber such that forces on the buffer layer 16 are not circumferentially uniform, that is, they do not all act radially outward about the circumference of the buffer layer 16, and/or they are not of equal magnitude about the circumference of the buffer layer 16. "Circumferentially", as used herein, refers to a path in a plane generally perpendicular to the longitudinal axis 15 along which the length of fiber 14 extends. One such path is shown at 17 in FIG. 4, and corresponds to the cross section of the outer surface of the buffer layer 16. According to the invention, the adhesion between the buffer layer 16 and the fiber core 18 is not reduced to the same extent as with prior art feedthroughs. Practice of the invention is considered, in some embodiments, to increase the adhesion between the buffer layer and the fiber core at some point about the circumference of the buffer layer due to shrinkage of the bonding agent during curing by compression of the buffer layer against the optical fiber cladding.

As shown in FIG. 5, the volume of bonding agent 88 includes an annular dome 92 having a radial thickness 93, which is preferably greater than the diameter of fiber 14, and includes an outer surface indicated as outer surface portions 94 and 95 in FIG. 5. The portion of the outer surface 94 does not adhere to a rigid surface integral with an optical package, while the portion of the outer surface 95 adheres to the bonding surface 96, which, upon soldering, brazing, welding or adhesive bonding of the feedthrough assembly to an optical package (as discussed in conjunction with FIG. 7), becomes a rigid surface integral with the package. Asymmetrically securing a fiber according to the invention is considered to generate additional force vectors 85 that act to push the buffer layer 16 against the fiber core 18, thereby increasing adhesion therebetween, though some force vectors be present that act to separate the buffer layer 16 from the fiber core 18.

Figure 6A:
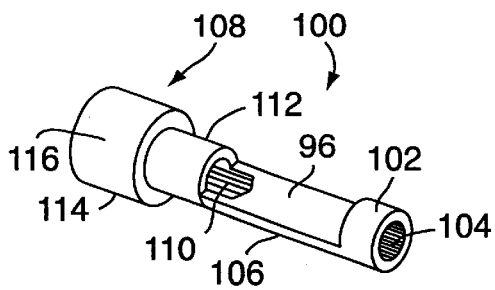
FIG. 6A is a perspective view of a feedthrough body according to the invention.

FIG. 6A illustrates a feedthrough body 100. The feedthrough body 100 includes a front section 102 having a passage 104 therethrough, a central section 106 having a generally planar bonding surface 96, and a rear section 108 including a front portion 112 and a rear portion 114. The outer surface 116 of the rear portion 114 typically is received by a passage in a package wall for securing the body 100 to the optical package such that the bonding surface 96 can be said to be integral with the package.

Figure 6B:
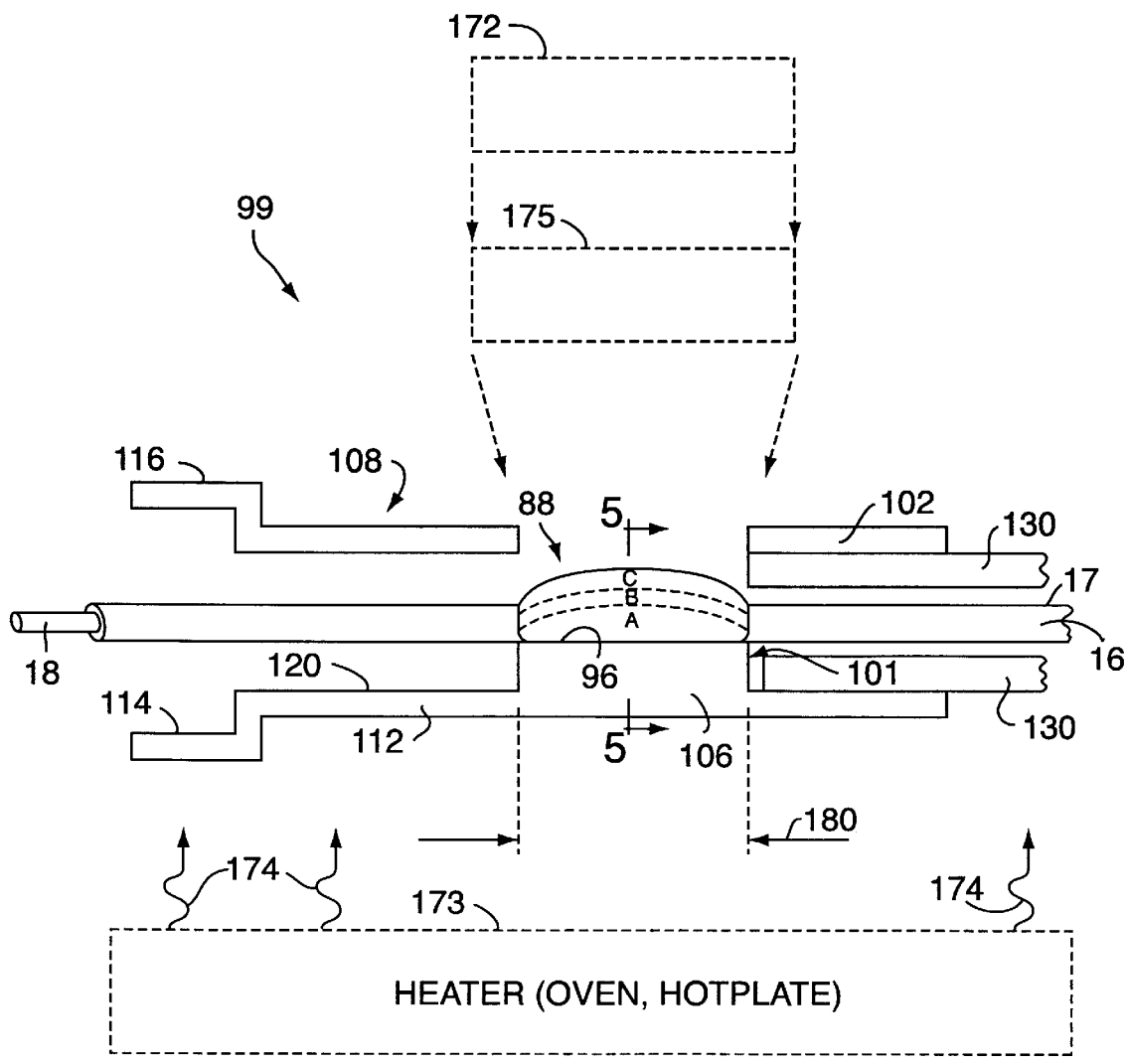
FIG. 6B is a longitudinal cross-sectional view of an optical fiber feedthrough assembly including a length of optical fiber asymmetrically secured to the feedthrough body of FIG. 6A.

FIG. 6B is an elevational view of feedthrough assembly including the feedthrough body 100 and a length of optical fiber 14 having an core 18 and a buffer layer 16. The length of optical fiber 14 passes through the passages 104 and 110 and is disposed along the bonding surface 96. A volume of bonding agent 88, such as an epoxy, asymmetrically secures the length of optical fiber 14 to the feedthrough body 100. Note that the bonding surface 96 is raised up from the inner wall 120 that defines the passage 110 through the rear section 108 of the feedthrough body 100. The cross-section of FIG. 5 is a view along the section line 5—5 of the optical fiber feedthrough assembly shown in FIG. 6B. A fiber protective tube 130 is disposed about the length of optical fiber 14 exiting the front portion 102 of the feedthrough body 100. The passage 104 has a diameter selected for receiving the fiber protective tube 130, as shown in FIG. 6B.

FIG. 6B also illustrates one embodiment of apparatus for practicing a method according to the invention for light-curing the volume of bonding agent 88. A light source 172, such as an ultraviolet light source, provides light for curing the volume of bonding agent 88, which in this instance includes a light curable bonding agent. The focusing element 175, such as a lens or arrangement of lenses, can vary the portion of the bonding agent upon which the light is focused. According to the invention, the light source is focused at different times on different portions of the volume of the bonding agent, such as the portions indicated by the letters "A", "B"and "C". Preferably the focal plane of the light source is progressively moved upward and away from the buffer layer of the fiber, such that the "A" portion is cured first, the "B" portion cured next, and the "C" portion thereafter. The volume of bonding agent is thus progressively cured, with those portions nearer the bonding surface being cured prior to those portion farther away from the bonding surface. The three portions, "A" "B and "C", shown in FIG. 6B are merely exemplary and are shown for the purpose of illustrating that different portions of the volume of the bonding agent 88 are to be cured at different times.

A heater 173 can also be provided for heating the volume of bonding agent 88, as indicated by the wavy lines 174, prior to and/or during the curing of the bonding agent 88. The heating of the volume of bonding agent 88 can serve to raise the glass transition temperature of the volume of bonding agent 88.

Figure 7:
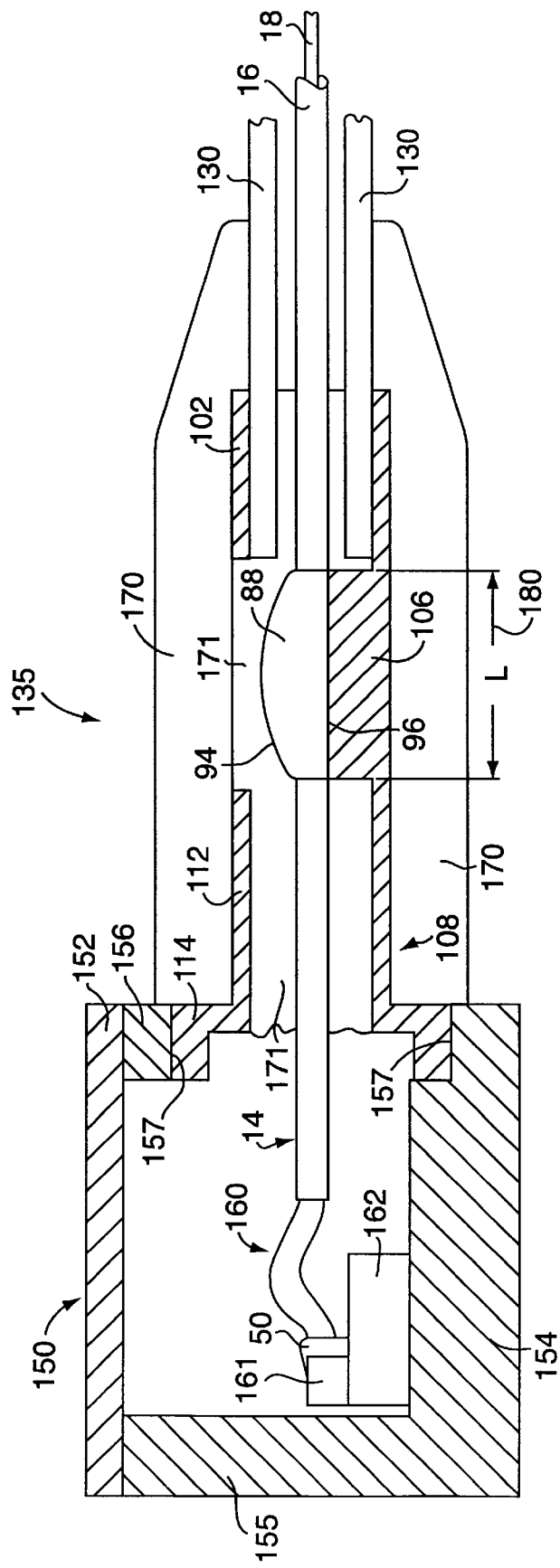
FIG. 7 is an elevational view of the optical fiber feedthrough assembly of FIG. 1 secured to an optical package.

FIG. 7 is an elevational view of the optical fiber feedthrough assembly of FIG. 6B integrated with an optical package 150. The optical package 150 typically includes a package body 154 and a package cover 152, as well as package walls, such as package walls 155 and 156. The rear portion 114 of the feedthrough body 100 is received by the package wall 156. The package wall 156 includes inner walls 157 that define a passage through the wall 156. The length of optical fiber 14 passes through this passage which also receives the portion 114 of the rear section 108 of the feedthrough body 100. Note that FIG. 7 is not drawn to scale, the feedthrough body 100 and length of optical fiber 14 are enlarged to show relevant detail.

Typically, the outer surface 116 (see FIGS. 6A and 6B) of the rear portion 114 is soldered, brazed, welded or adhesive bonded to the package wall surfaces 157 defining a passage through the package wall 156. The length of optical fiber 14 typically forms a slack bow 160 for stress relief and then is secured via an optical interconnect 50 to an optical component 161, which, in FIG. 7, is shown as mounted by a mounting block 162. A boot 170 is disposed about at least the front and center portions 102 and 106, respectively, of the feedthrough body 100 and also contacts the fiber protective tube 130. The space 171 indicated in FIG. 7 can be filled with a compliant material, such as RTV adhesive. Although the compliant material may adhere to the outer surface 94 of the volume of bonding agent 88 asymmetrically securing the length of optical fiber 14 to the package 150, the outer surface 94 adheres to the compliant material and not to a rigid surface. Typically, the compliant material can be added after the volume of bonding agent 88 is cured. Typically, the volume of bonding agent 88 is an epoxy, such as a thermally cured epoxy.

With reference to FIGS. 6A, 6B and 7, note that the front and rear portions 102 and 108, respectively, of the feedthrough body 100 have inner and outer walls that extend fully circumferentially about the longitudinal axis 15, the inner walls defining the passages 104 and 110 through which the length of optical fiber 14 passes. The center section 106 is cutaway, that is, it does not include a wall that extends fully circumferentially about the longitudinal axis and the bonding surface 96 or the volume of bonding agent 88 disposed upon the bonding surface 96 is exposed. Accordingly, the volume of bonding agent 88 can include a light cured epoxy, such as an epoxy cured by ultraviolet light. A light cured epoxy is typically cured significantly faster than a thermally cured epoxy. The feedthrough assembly of FIG. 6B can thus be manufactured in a more efficient and cost effective manner.

Load tests performed on asymmetrically secured lengths of optical fiber indicate that, according to the invention, an optical fiber feedthrough capable of withstanding up to 1.7 kg loads can be readily provided. The load bearing capacity of optical fiber feedthroughs was investigated as a function of the length 180 of the volume of bonding agent 88 adhering to the bonding surface 96 and fiber buffer 16, the mixture of the bonding agent, and the volume of bonding agent 88. The amount was determined by the number of drops of bonding agent, in these tests an epoxy, dispensed from a micro spatula. Lengths 180 of 3 mm, 7.5 mm and 12 mm were investigated as were epoxy mix ratios of 1:10, 1:3 and 1:1. Two compatible epoxies were mixed in these ratios to study the effects of different hardness, shrinkage, flexibility and other characteristics. The amount of epoxy was varied from 1 to 4 drops dispensed from the micro spatula. The results were modeled, the modeling is shown graphically in FIG. 8. Note that the response surface 185 indicates that a length of fiber asymmetrically secured according to the invention can readily withstand loads above 1 kg, in accordance with the industry standard. The modeling indicates that the load bearing capacity depends on the length 180 of the bond, the amount of the volume of bonding agent 88, and the length 180.

Figure 1:
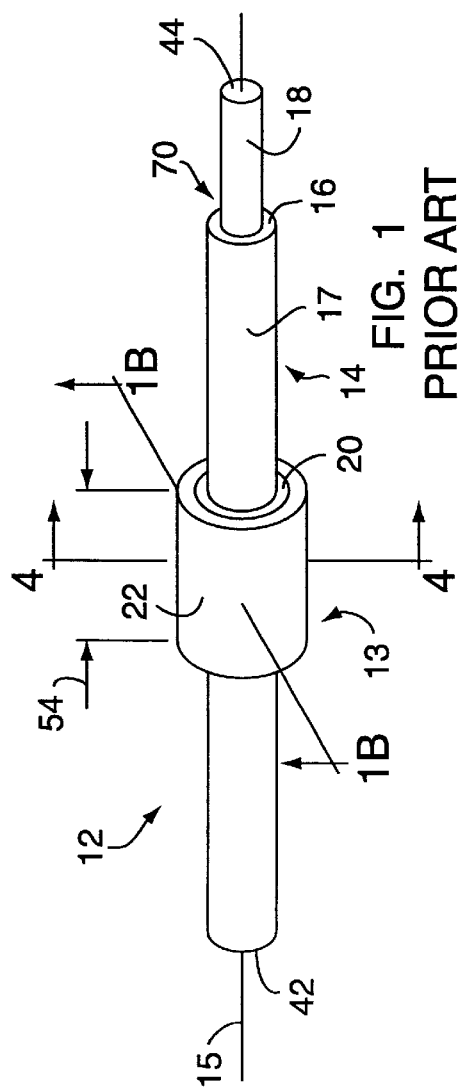
FIG. 1A is a perspective view of a prior art optical fiber feedthrough assembly.
Figures 8, 9:
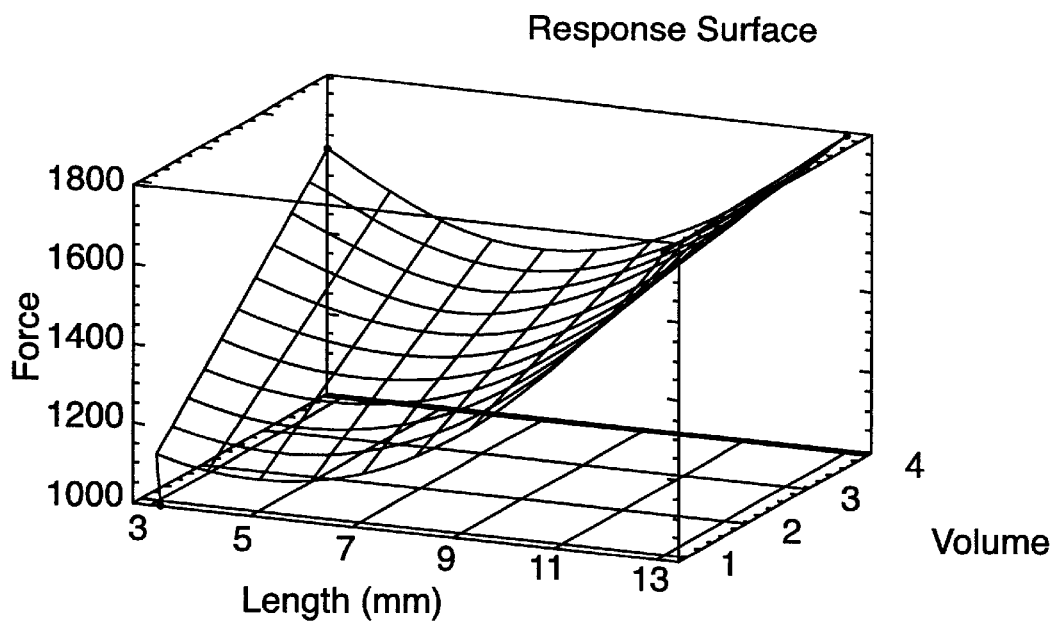
FIG. 8 is a graphically illustrates the modeling of the results of load testing an optical fiber feedthrough provided in accordance with the invention.
FIG. 9 is a table of results of a tests performed to confirm the test results shown modeled in FIG. 8.

The response surface 185 shown in FIG. 8 indicates that the load capacity of a optical fiber feedthrough provided according to the invention can exceed 1.8 kg for bond lengths exceeding 12 mm and exceed 1.6 kg for bond lengths of approximately 3 mm. The load bearing capacity increases proportionally with the amount of the volume of bonding agent, supporting the hypothesis that the asymmetrical securing of a length of fiber according to the invention allows shrinkage of the bonding agent to capture the fiber. In contrast, experiments performed using the prior art feedthrough assembly 12 shown in FIG. 1 indicated that increasing the diameter of the feedthrough tube 13 and, accordingly, increasing the amount of the bonding agent securing the length of fiber 14 to the tube 13, actually decreased the load bearing capacity of the optical fiber feedthrough assembly 14. These prior experiments also showed that the load bearing capacity became independent of bond length for tubes 13 of large diameter. Note that the length 180 of the bond is an important consideration, as in other fields of technical endeavor, efforts are always being made to minimize the size of components. An optical fiber feedthrough that can meet the industry standard of 1 kg within a relatively short distance, such as a 3 mm bond length 180, as is provided by the invention, is particularly advantageous.

FIG. 9 is a table showing experiments performed to confirm the results modeled in FIG. 8. The length 180 of the bonding surface was 4 mm. Note that all but one of the asymmetrically secured optical fiber feedthroughs tested in FIG. 9 met the 1 kg industry load standard. As also shown in FIG. 9, the epoxy 301–2 is preferable as the bonding agent. 301–2 refers to a flexible epoxy available from Epoxy Technology, Inc., 14 Fortune Drive, Billerica, Massachusetts 01821.

Use of the feedthrough body 100 to form a optical fiber feedthrough assembly wherein the length of optical fiber 14 is asymmetrically secured to the feedthrough body 100 and, hence, to a package when the feedthrough body 100 is secured to the package, is considered advantageous for a number of reasons. First, the optical fiber assembly can be fabricated alone and inserted into a package later. Secondly, customers typically specify that the fiber protective tube 130 fit loosely over the length of optical fiber 14. With prior designs, problems are sometimes experienced with the bonding agent wicking down inside the fiber protective tube 130 and bonding the fiber protective tube to the length of optical fiber 14. The separate front and center sections of the feedthrough body 100 tends to lessen the likelihood of the bonding agent wicking down the inside of the fiber protective tube. As the bonding surface 96 is raised via a platform from at least a portion of the wall forming the passage into which the fiber protective tube is placed. Those of ordinary skill in the art, apprised of the disclosure herein, understand that the raised platform can include features such as surface roughness to provide enhanced mechanical tooth for bonding, or can be deburred or include radiused edges in the areas where the fiber passes over the edge to protect the fiber from nicks which could propagate fractures.

In addition, because the center portion 106 of the feedthrough body 100 is cutaway, the bonding agent 88 can be rapidly cured by ultraviolet light. Accordingly, optical fiber feedthrough assemblies, such as that shown in FIG. 6B, can be produced more quickly and more efficiently and at reduced cost.

Figure 10:
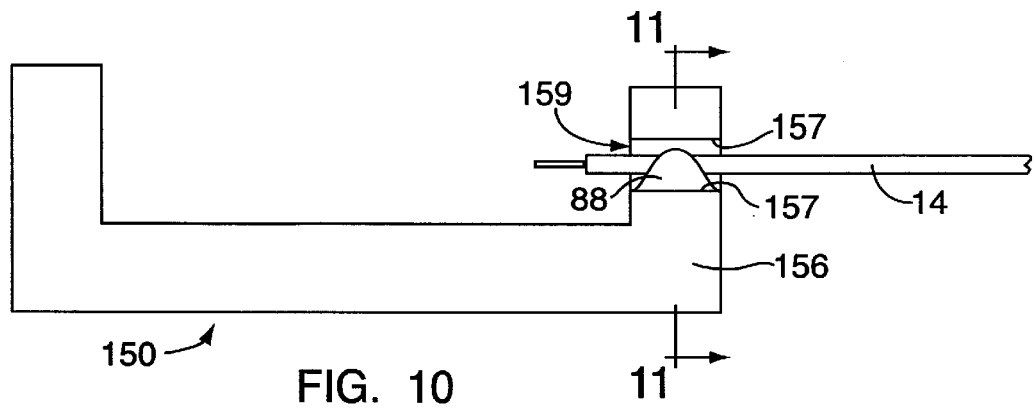
FIG. 10 is a cross-sectional view of an optical package having a package wall and a length of fiber passing through a passage in the package wall and asymmetrically secured to the package.
Figure 11:
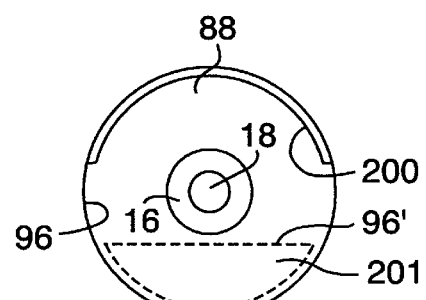
FIG. 11 is a cross-sectional view taken along section line 11—11 of FIG. 10 and illustrates an example of a fiber asymmetrically secured according to the invention.
Figure 12:
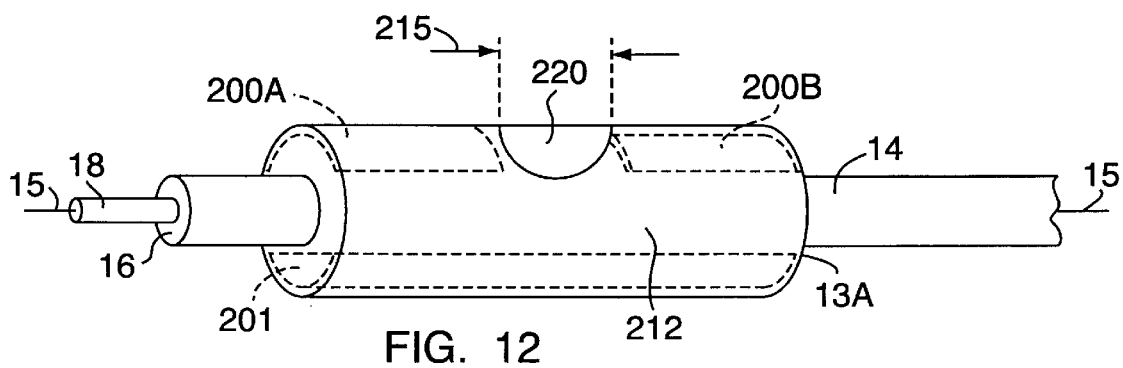
FIG. 12 illustrates yet another embodiment of an optical fiber feedthrough assembly according to the invention.

With reference to FIGS. 10–12, the feedthrough body 100 is not necessary to asymmetrically secure a length of optical fiber to a package so as to provide an optical fiber feedthrough in accordance with the invention. However, it is considered that use of the feedthrough body 100 is more convenient and advantageous, as noted above.

FIG. 10 shows an optical package 150 having a package wall 156 in which inner walls 157 define a passage 159 through the wall 155. The length of optical fiber 14 passes through the passage 159 and is asymmetrically secured by the volume of the bonding agent 88 to the package 155.

FIG. 11 is a cross section illustrating an alternative technique for asymmetrically securing the length of optical fiber 14 and can correspond to a cross-section taken along line 11—11 in FIG. 10 and also indicate a crosssection taken along the section line of a feedthrough tube, such as the feedthrough tube 13 shown in FIG. 1A, in which the length of optical fiber 14 is asymmetrically secured to the feedthrough tube. A spacer 200 is interposed between the volume of bonding agent 88 and a portion of the wall 157 defining the passage 159. This spacer prevents the volume of bonding agent 88 from adhering to a rigid surface integral with the package 150. The spacer can be made of Teflon or any other material that prevents adhesion of the bonding agent 88 to a rigid surface integral with the package 150. The volume of bonding agent does adhere to the bonding surface 96. Optionally, a "D" shaped spacer 201 may be included as shown in FIG. 11. The spacer 201 provides a bonding surface 96' to which the volume of bonding agent 88 can adhere. 304 stainless steel is one material considered suitable for the "D" spacer 201.

FIG. 12 indicates a design in which a feedthrough tube 13A has an outer surface 212. The outer surface 212 extends less than fully circumferentially about the longitudinal axis for at least a central portion of the feedthrough tube 215 such that an aperture 220 is formed in the feedthrough tube 13. A syringe can be used to deposit a selected amount of bonding agent for asymmetrically securing the fiber to the feedthrough tube 13. The syringe is inserted in the aperture 220 and a selected amount of bonding agent is dispensed. After the bonding agent is cured, such as by thermal curing or ultraviolet curing, the tube can then be filled with a compliant adhesive, such as RTV. The spacers 200A, 200B and 201 can also optionally be included in the tube 13A, as shown in FIG. 12.

While preferred embodiments have been shown and described, various modifications and substitutions may be made without departing from the spirit and scope of the invention. Accordingly, it is to be understood that the present invention has been described by way of example and not by limitation.

What is claimed as new and to be secured by letters patent is:

1. An optical package assembly for housing an optical component within the package and including provision for communicating an optical signal from an environment exterior to the package to the optical component, comprising:
    a package wall including a passage therethrough;
    a length of optical fiber including a buffer layer, said length of fiber extending along a longitudinal axis and through said passage for communicating the optical signal between the exterior and the interior of the said package;
    a volume of bonding agent adhering to said buffer layer and to a bonding surface integral with said package, said volume of bonding agent disposed for asymmetrically securing said fiber to said package such that a load of approximately 1 kg or less applied to a first end of said length of fiber is not substantially transmitted to the other end of said length of fiber.

2. The optical package assembly of claim 1, wherein said length of optical fiber is a length of polarization maintaining optical fiber.

3. The optical package assembly of claim 1, including a volume of a compliant material disposed with said bonding agent.

4. The optical package assembly of claim 1, wherein said volume of bonding agent includes thermally cured adhesive.

5. The optical package assembly of claim 1, wherein said volume of bonding agent includes ultraviolet-light cured adhesive.

6. The optical package assembly of claim 1, including a fiber protective tube disposed about a portion of said length of fiber and secured to said package and a boot disposed about a portion of said fiber protective tube.

7. The optical package assembly of claim 1, wherein an inner surface of said volume of bonding agent adheres to said buffer layer and a portion of the outer surface thereof adheres to said bonding surface, said portion extending less than fully circumferentially about said longitudinal axis.

8. The optical package assembly of claim 1, wherein said volume of bonding agent is non-uniformly distributed circumferentially about said longitudinal axis.

9. The optical package assembly of claim 1, wherein said volume of bonding agent forms an annular dome having an outer surface not bonded to a rigid surface integral with said package.

10. The optical package assembly of claim 1, wherein the length of said volume of bonding agent along the longitudinal axis is less than approximately 12 mm.

11. An optical package assembly for housing an optical component within the package and including provision for communicating an optical signal from an environment exterior to the package to the optical component comprising:
    a package wall including a passage therethrough;
    a length of optical fiber including a buffer layer, said length of fiber extending, along a longitudinal axis and through said passage for communicating the optical signal between the exterior and the interior of the said package;
    a volume of bonding agent adhering to said buffer layer and to a bonding surface integral with said package, said volume of bonding agent disposed for asymmetrically securing said fiber to said package such that a load of approximately 1 kg or less applied to a first end of said length of fiber is not substantially transmitted to the other end of said length of fiber;
    a feedthrough body secured to said package, said feedthrough body having a first body section having a passage through which the fiber passes to a second body section, said second body section including a feedthrough bonding surface and a third body section for receiving said fiber from said second section, said third section having an outer surface integral with said package includes said feedthrough bonding surface.

12. The optical package assembly of claim 11, wherein said third section forms a passage through which said length of fiber passes.

13. The optical package assembly of claim 11, wherein said second section includes a wall having an outer surface and an inner surface defining said feedfthrough bonding surface, at least a first length of said center section wall extending less than fully circumferentially about said longitudinal axis.

14. The optical package assembly of claim 11, wherein said feedthrough bonding surface is substantially planar.

15. The optical package assembly of claim 11, wherein said first passage has an inner diameter selected for accommodating a fiber protective tube disposed about the optical fiber and an outer diameter selected for accommodating a boot disposed over said fiber protective tube.

16. An optical fiber feedthrough assembly for receiving a fiber including a buffer layer and for securing said fiber to a package, the fiber feedthrough assembly comprising:
    a feedthrough body, said feedthrough body defining a longitudinally extending passage therethrough and having a bonding surface and an outer surface for securing to the optical package;

a length of optical fiber having a core and buffer layers, said length passing through said passage and along said bonding surface; and a volume of bonding agent disposed for asymmetrically securing said fiber to said feedthrough body for reducing the transmission of force applied to a first end of the fiber to the core at the second end thereof, said volume having an inner surface adhering to said buffer layer and an outer surface adhering to said bonding surface.

17. The optical fiber feedthrough assembly of claim 16, wherein said bonding agent is a light-cured adhesive.

18. The optical fiber feedthrough assembly of claim 16, wherein said bonding agent is a thermally-cured adhesive.

19. The optical fiber feedthrough assembly of claim 16, wherein said volume of adhesive is non uniformly disposed in cross section perpendicular to said longitudinal axis.

20. An optical fiber feedthrough assembly for receiving a fiber including a buffer layer and for securing said fiber to a package, the fiber feedthrough assembly comprising:

a feedthrough body said feedthrough body defining a longitudinally extending passage therethrough and having a bonding surface and an outer surface for securing to the optical package;

a length of optical fiber having a core and buffer layers, said length passing through said passage and along said bonding surface; and a volume of bonding agent disposed for asymmetrically securing said fiber to said feedthrough body for reducing the transmission of force applied to a first end the fiber to the core at the second end thereof, said volume having an inner surface adhering to said buffer layer and an outer surface adhering to said bonding surface, wherein said volume of bonding agent has an outer surface having first and second portions, a first portion adhering to a rigid surface integral with said feedthrough body and a second portion not bonded to a rigid surface integral with said feedthrough body.

21. The feedthrough assembly of claim 16, wherein said bonding agent is non uniformly distributed in a cross section plane perpendicular to said longitudinal axis.

22. An optical fiber feedthrough body extending along a longitudinal axis, the fiber feedthrough body comprising:

a first section having an inner wall surface defining a longitudinally extending first passage therethrough and having a cylindrical outer surface;

a second section having a wall having an outer surface and a longitudinally extending inner bonding surface, said bonding surface raised relative to a portion of said first inner wall surface defining said first passage, the center section wall corresponding to a least a first length of said center section extending less than fully circumferentially about said longitudinal axis;

a third section defining a second longitudinally extending passage therethrough and having a cylindrical outer surface, and wherein said passages and bonding surface are disposed for receiving a length of optical fiber through said passages and adjacent said bonding surface for bonding thereto.

23. The optical fiber feedthrough body of claim 22, wherein said bonding surface is substantially planar.

24. The optical fiber feedthrough body of claim 22, wherein at least a portion of said bonding surface is exposed so as to allow illumination of a bonding agent disposed for bonding a fiber to said bonding surface for curing said bonding agent.

25. The apparatus of claim 24, wherein said bonding surface is substantially planar.

26. The optical fiber feedthrough body of claim 24, wherein said first passage has an inner diameter selected for accommodating a fiber protective tube disposed about the optical fiber.

27. The optical fiber feedthrough of claim 24, wherein said bonding surface has a length of less than approximately 3 mm.

28. A method of providing an optical fiber feedthrough for communicating an optical signal from a first side of a package wall to a second side thereof and such that loads of less than approximately 1 kg applied to one end of the fiber are not substantially transmitted to the other end of the fiber, the method comprising the steps of:

providing a length of the optical fiber having a core and a buffer layer;

providing a passage through the package wall;

providing a bonding surface integral with said package wall and disposed for securing the length of fiber when the length extends through the passage;

placing said length of fiber through said passage;

providing a volume of bonding agent; and asymmetrically securing the fiber to the package wall such that loads of approximately 1 kg or less applied to a first end the fiber are substantially not transmitted to the core of the fiber at the other end of the fiber, the step of asymmetrically securing including disposing the bonding agent for adhering to the buffer layer and to said bonding surface.

29. The method of claim 28, wherein the step of providing the volume of the bonding agent includes the step of providing a volume of thermally cured epoxy and further including the step of thermally curing the adhesive.

30. The method of claim 28, wherein the step of providing the volume of the bonding agent includes the step of providing a volume of ultraviolet light curable adhesive and further including the step of exposing the volume of bonding agent to ultraviolet light.

31. The method of claim 28, wherein the step of asymmetrically securing includes disposing the volume of bonding agent such that the length along the fiber of the bonding surface to which the bonding agent adheres is less than approximately 12 mm.

32. The method of claim 28, wherein the step of providing a bonding surface includes providing a feedthrough body having a first portion for insertion in the passage and a feedthrough bonding surface, the bonding surface including the feedthrough bonding surface.

33. The method of claim 28, wherein the step of asymmetrically securing the fiber includes disposing the volume of bonding agent to form an annular dome having an outer surface not bonded to a rigid surface integral with the package wall.

34. A method of securing an optical fiber to a surface, comprising the steps of:

providing the surface;

providing a length of optical fiber having a core and a buffer layer;

providing a volume of light curable bonding agent;

disposing the volume of bonding agent about at least a portion of the buffer layer of the fiber and in contact with the surface for securing the length of fiber to the surface when the bonding agent is cured;

providing a light source for producing light for curing the volume of bonding agent focusing light from the light source for curing a first portion of the volume of bonding agent; and focusing the light from the light source for curing a second portion of the volume of the bonding agent.

35. The method of claim 34, including the step of heating the volume of bonding agent.

* * * * *

UNITED STATES PATENT AND TRADEMARK OFFICE
CERTIFICATE OF CORRECTION

PATENT NO. : 6,292,615 B1
DATED : September 18, 2001
INVENTOR(S) : Scott A. Merritt et al.

It is certified that error appears in the above-identified patent and that said Letters Patent is hereby corrected as shown below:

<u>Column 11, claim 20,</u>
Line 18, after "a feedthrough body", please insert -- , --.
Line 27, after "applied to a first end", please insert -- of --.

Signed and Sealed this

Second Day of April, 2002

Attest:

JAMES E. ROGAN
*Attesting Officer*       *Director of the United States Patent and Trademark Office*